United States Patent [19]
Rava

[11] 3,954,310
[45] May 4, 1976

[54] RADIAL MAGNETIC BEARING

[76] Inventor: Edoardo Rava, Savonera, Turin, Italy

[22] Filed: Jan. 12, 1972

[21] Appl. No.: 217,208

[30] Foreign Application Priority Data
Sept. 30, 1971    Italy .................................. 70202/71

[52] U.S. Cl. .................................................. 308/10
[51] Int. Cl.² ........................................ F16C 39/06
[58] Field of Search ...................................... 308/10

[56] References Cited
UNITED STATES PATENTS

| | | |
|---|---|---|
| 2,582,788 | 1/1952 | Mendelsohn .......................... 308/10 |
| 2,869,934 | 1/1959 | Milligan et al ........................ 308/10 |
| 3,357,756 | 12/1967 | Fehr ....................................... 308/10 |
| 3,565,495 | 2/1971 | Lyman ................................... 308/10 |

Primary Examiner—Donovan F. Duggan

[57] ABSTRACT

The invention concerns a radial magnetic bearing, which includes an annular fixed magnet, provided with a series of concentric protrusions on its upper and lower surfaces, and a rotating shaft coaxial to the annular magnet, and which has two polar expansions of an annular shape and radially directed which define the housing of the annular magnet and have a series of concentric protrusions, on the walls facing the magnet and positioned exactly opposite the protrusions formed on the face of the magnet.

1 Claim, 3 Drawing Figures

U.S. Patent May 4, 1976 3,954,310
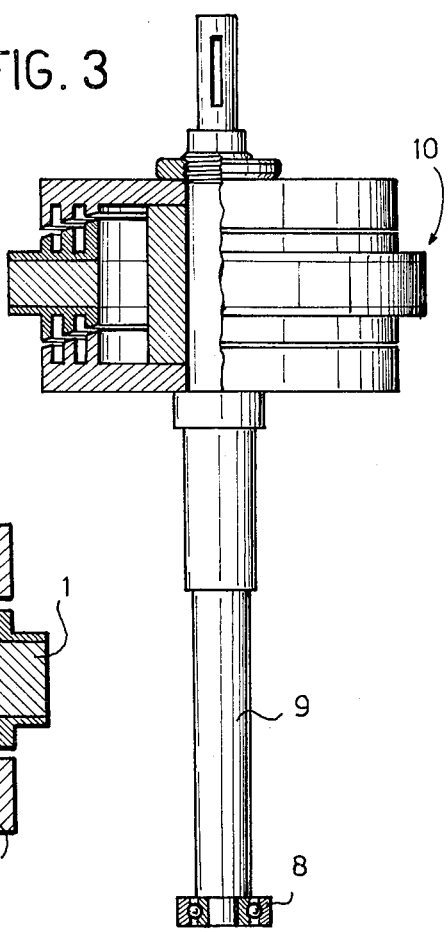
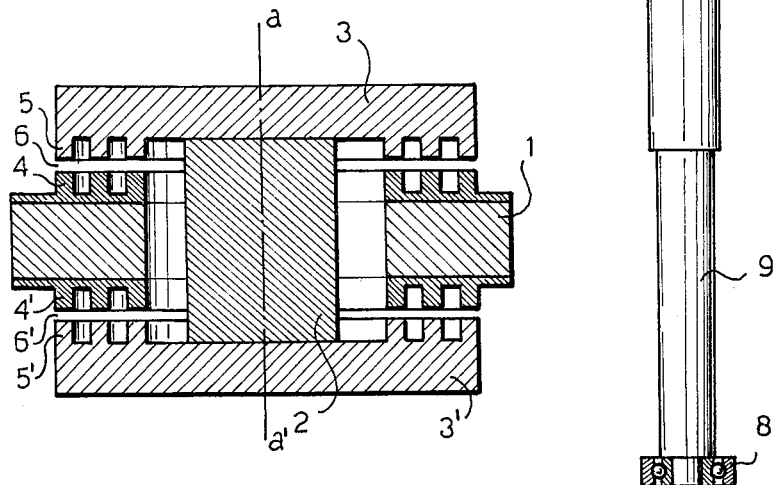
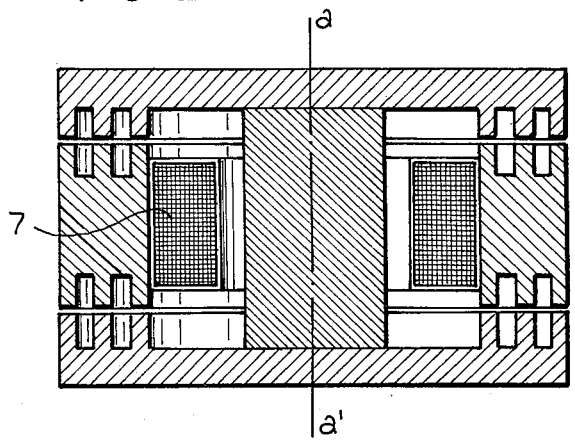

RADIAL MAGNETIC BEARING

This invention concerns a radial magnetic bearing.

The bearing according to the invention consists of a fixed annular magnet, which has a series of concentric protrusions on its upper and lower surfaces, generally obtained from rings of ferromagnetic material, together with a rotor, coaxial to the magnet and having two radially directed polar expansions, which delimit the housing for the magnet: the surfaces of these polar expansions positioned opposite the faces of the magnet also have a series of concentric protrusions facing those of the magnet and separated therefrom by one or more air-gaps.

The magnet can either be permanent or can consist of an electromagnet.

According to a preferred embodiment of the invention, these air-gaps are delimited by flat surfaces; according to a variant the surfaces which define the air-gaps present a curvature which can be spherical or parabolical or of another kind.

According to another characteristic of the invention, the rotor is made of magnetizable material, as for example steel or soft iron, and it can also be magnetized. The bearing according to the invention allows to eliminate completely the anti-vibration suspensions of the stator which are necessary in other types of low-rigidity bearings.

Further characteristics of the invention will be evident from the following description, which refers to the attached drawings, in which:

FIG. 1 represents an axial section of the bearing according to the invention.

FIG. 2 represents a variant in which an electromagnet is used, and

FIG. 3 shows a bearing according to the invention coupled with a ball bearing.

As can be seen in the drawing (FIG. 1), the bearing according to the invention consists of a fixed part, made up of an annular magnet 1, and a mobile part, made up of the shaft 2 coaxial to the magnet and free to rotate around the axis $a - a'$. The shaft 2 is made of magnetizable material and can be mounted either on the outside or the inside of magnet 1, as seen in the drawing, and to this shaft are anchored two polar expansions 3 — 3' radially directed, also having an annular form, and which define the housing for the magnet 1.

The expansions 3 — 3' can be detached from the shaft 2 in order to allow the assembling of the magnet.

The upper and lower surfaces of magnet 1 have each a series of teeth or concentric protrusions, 4, 4' respectively, facing analogous protrusions 5, 5' existing on the surfaces of the polar expansions turned towards the magnet, and separated from said expansions by one or more air-gaps 6, 6'.

Magnet 1 can be permanent, as seen in FIG. 1, or it can be an electromagnet, as seen in FIG. 2, where the excitation solenoid is marked by 7.

The bearing according to the invention can be used together with electrical or mechanical devices able to withstand the axial thrust. In any case, owing to the absence of lubricants it is particularly suitable for use in a vacuum. A particularly interesting application is represented in FIG. 3, in which the magnetic bearing according to the invention, indicated as a whole by 10, is coupled by means of a shaft 9 to a ball bearing or a pivot 8, intended to ensure the axial stability of the system. The solution represented in FIG. 3 is particularly suitable for ultracentrifuges or molecular turbine pumps, in which minimal loads, exceptional duration and silent functioning are necessary.

A further advantage is to have the spindle turning completely in the preparatory vacuum of $10^{-3}$ Torr so avoiding to pollute the high vacuum.

One can also see in the drawing that the concentric teeth on the polar expansions and on the magnet can have different heights. Teeth 4 on the upper surface of the magnet can have, for example, heights decreasing from the centre of the magnet towards the circumference, while teeth 4', on the lower surface of the magnet can have increasing heights from the centre to the circumference. Teeth 5, 5' of the polar expansions 3, 3' follow the varying heights of teeth 4, 4' of the magnet 1, in order to keep the thickness of the air-gap or air-gaps constant. In this case the facing parts of the two pairs of series of protrusions and the surfaces of separation between the air-gaps can also be flat or can have a spherical, parabolical or another type of curvature, which will be chosen according to the required characteristics of rigidness.

The bearing according to the invention works in the following way:

The fixed magnet 1 generates a magnetic flux which leaves the stator through the teeth 4, 4' and enters the rotor through teeth 5, 5', closing the magnetic circuit through shaft 2. The presence of such a magnetic field does not prevent the rotation around axis $a - a'$, because such rotation does not cause variations of reluctance; however, if a radial movement of one part of the bearing with respect to the other occurs, a variation of reluctance is produced which generates a recall force which brings the bearing back into the exact central position.

Obviously what has been described is only given as an example and is not restrictive. It can have variants and modifications without departing from the protective range of the invention: for example the rotor of the bearing could also be magnetized, and two bearings according to the invention can be employed at both ends of a rotor having its axis horizontal or vertical.

What is claimed is:

1. A magnetic bearing comprising:
   a. a fixed, annular magnet having opposed ends substantially transverse the longitudinal axis thereof;
   b. a plurality of axially extending, concentric rings integral with said ends of said magnet;
   c. a rotatable shaft coaxial with said magnets;
   d. a pair of axially spaced apart end caps integral with said shaft, each said end cap being in opposition to one end of said magnet for defining the housing thereof; and
   e. a plurality of axially extending, concentric rings integral with each said end cap, said rings of each said end cap being aligned with said rings of said magnet that are in opposition thereto, said rings of said end cap being axially spaced from said rings of said magnet for defining an air gap therebetween, said rings of said magnet having different axial lengths and said rings of said end caps having correspondingly different axial lengths whereby the axial dimension of said air gap therebetween is substantially constant and whereby the opposed surfaces of said rings defining said air gap are in arcuate planes.

* * * * *